United States Patent
DeLuca et al.

(10) Patent No.: US 10,949,457 B2
(45) Date of Patent: Mar. 16, 2021

(54) MODIFYING PLAYBACK OF MEDIA CONTENT BASED ON ESTIMATED TRAVEL TIME OF A USER

(71) Applicant: INTERNATIONAL BUSINESS MACHINES CORPORATION, Armonk, NY (US)

(72) Inventors: Lisa Seacat DeLuca, Baltimore, MD (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 16/118,662

(22) Filed: Aug. 31, 2018

(65) Prior Publication Data
US 2020/0073954 A1  Mar. 5, 2020

(51) Int. Cl.
| | | |
|---|---|---|
| *G06F 16/00* | (2019.01) | |
| *G06F 16/438* | (2019.01) | |
| *H04W 4/029* | (2018.01) | |
| *G06F 3/16* | (2006.01) | |
| *G01C 21/36* | (2006.01) | |
| *G06F 16/48* | (2019.01) | |

(52) U.S. Cl.
CPC ..... *G06F 16/4393* (2019.01); *G01C 21/3697* (2013.01); *G06F 3/165* (2013.01); *G06F 16/489* (2019.01); *H04W 4/029* (2018.02)

(58) Field of Classification Search
CPC .... G06F 16/4393; G06F 16/489; G06F 3/165; H04W 4/029; G01C 21/3697
See application file for complete search history.

(56) References Cited

U.S. PATENT DOCUMENTS

| | | | |
|---|---|---|---|
| 8,260,915 B1 | 9/2012 | Ashear | |
| 8,990,848 B2 | 3/2015 | Basso et al. | |
| 9,363,544 B2* | 6/2016 | Tomita | G06Q 10/02 |
| 2002/0054073 A1 | 5/2002 | Yuen | |
| 2003/0114968 A1* | 6/2003 | Sato | G01C 21/26 701/36 |
| 2006/0114757 A1 | 6/2006 | Theimer et al. | |
| 2009/0187300 A1 | 7/2009 | Everitt et al. | |
| 2009/0313564 A1* | 12/2009 | Rottler | G11B 27/329 715/764 |

(Continued)

OTHER PUBLICATIONS

Adcock et al., "Are We There Yet? User-Centered Temporal Awareness," Invisible Computing, Feb. 2009, p. 97-99, IEEE Computer Society.

(Continued)

*Primary Examiner* — Alexander Khong
(74) *Attorney, Agent, or Firm* — Jordan T. Schiller (57) ABSTRACT

A method for implementing a program that modifies playback of media content to fit an estimated travel time of a user. The method includes receiving an estimated playback time of the media content and an estimated travel time of a user to reach a destination. The method further includes generating one or more multimedia playback options for the media content based on the length of the media content and the estimated travel time of the user to reach the destination, and modifying the one or more multimedia playback options for the media content to fit an updated travel time of the user.

12 Claims, 6 Drawing Sheets

(56) References Cited

U.S. PATENT DOCUMENTS

| | | | | |
|---|---|---|---|---|
| 2011/0130852 | A1* | 6/2011 | Thorn | G06F 16/4387 |
| | | | | 700/94 |
| 2012/0001923 | A1 | 1/2012 | Weinzimmer et al. | |
| 2014/0281976 | A1 | 9/2014 | Chia et al. | |
| 2016/0321699 | A1 | 11/2016 | Shahraray et al. | |
| 2016/0373817 | A1* | 12/2016 | Drake | G11B 27/031 |
| 2018/0172458 | A1* | 6/2018 | Yamamoto | G01C 21/3438 |
| 2018/0188054 | A1* | 7/2018 | Kennedy | G08G 1/09675 |
| 2020/0007943 | A1* | 1/2020 | Filmeyer | G06F 16/745 |
| 2020/0059535 | A1* | 2/2020 | Navarro | H04L 67/32 |

OTHER PUBLICATIONS

Alt et al., "Enabling Micro-Entertainment in Vehicles Based on Context Information," Proceedings of the Second International Conference on Automotive User Interfaces and Interactive Vehicular Applications (AutomotiveUI 2010), Nov. 11-12, 2010, p. 117-124, ACM, Pittsburgh, Pennsylvania.

Garber, "The Rise of 'Speed-Listening'," The Atlantic, Jun. 24, 2015, p. 1-4, https://www.theatlantic.com/technology/archive/2015/06/the-rise-of-speed-listening/396740/, Accessed on Aug. 28, 2018.

Graham, "Book Sales are in Decline but Audio Books are Thriving," CNBC, Mar. 3, 2016, p. 1-3, https://www.cnbc.com/2016/03/03/book-sales-are-in-decline-but-audio-books-are-thriving.html, Accessed on Aug. 28, 2018.

Ha, "America's Unhealthy Obsession with Productivity is Driving its Biggest New Reading Trend," Quartz, Mar. 31, 2017, p. 1-9, https://qz.com/924075/audiobook-readers-obsessed-with-multitasking-are-driving-americas-biggest-new-reading-trend/, Accessed on Aug. 28, 2018.

Mell et al., "The NIST Definition of Cloud Computing," National Institute of Standards and Technology, Sep. 2011, p. 1-3, Special Publication 800-145.

Wikipedia, "Audiobook," Wikipedia: the Free Encyclopedia, Last Edited on Aug. 2, 2018, p. 1-12, https://en.wiikipedia.org/wiki/Audiobook, Accessed on Aug. 28, 2018.

\* cited by examiner

MODIFYING PLAYBACK OF MEDIA CONTENT BASED ON ESTIMATED TRAVEL TIME OF A USER

BACKGROUND

The present disclosure relates generally to the field of cognitive computing, Internet of Things (IoT), and more particularly to data processing and dynamic adjustment of multimedia content based on estimated travel time of a user to reach a destination while driving in a vehicle.

The audiobook market has steadily increased over the last decade with various applications that enable users to download books right onto their computing devices and listen to them while doing other things, such as driving in a vehicle.

However, oftentimes a user does not want to stop listening to an audiobook halfway through a chapter since it makes it harder to pick up the listening at a later date and remember the related events from the beginning of a chapter.

BRIEF SUMMARY

Embodiments of the present invention disclose a method, a computer program product, and a system.

A method, according to an embodiment of the invention, in a data processing system including a processor and a memory, for implementing a program that modifies playback of media content to fit an estimated travel time of a user. The method includes receiving an estimated playback time of the media content and an estimated travel time of a user to reach a destination. The method further includes generating one or more multimedia playback options for the media content based on the length of the media content and the estimated travel time of the user to reach the destination, and modifying the one or more multimedia playback options for the media content to fit an updated travel time of the user.

A computer program product, according to an embodiment of the invention, includes a non-transitory tangible storage device having program code embodied therewith. The program code is executable by a processor of a computer to perform a method. The method includes receiving an estimated playback time of the media content and an estimated travel time of a user to reach a destination. The method further includes generating one or more multimedia playback options for the media content based on the length of the media content and the estimated travel time of the user to reach the destination, and modifying the one or more multimedia playback options for the media content to fit an updated travel time of the user.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes receiving an estimated playback time of the media content and an estimated travel time of a user to reach a destination. The method further includes generating one or more multimedia playback options for the media content based on the length of the media content and the estimated travel time of the user to reach the destination, and modifying the one or more multimedia playback options for the media content to fit an updated travel time of the user.

DETAILED DESCRIPTION

The present invention discloses a method that dynamically modifies, or adjusts, the multimedia playback of media content on a media player system of a vehicle, based on an estimated travel time of a user.

The present invention proposes a method to improve multimedia playback within a vehicle based on route information and time. The proposed method also takes into consideration a user's personal preferences for multimedia playback and incorporates those preferences into an allotted driving timeframe to reach a destination, so as to give the user an optimal multimedia listening (or viewing) experience while driving or sitting in a car as a passenger.

Although the preferred exemplary embodiments discussed herein relate to use of the invention in a vehicle, it may also be employed by bikers, joggers, walkers on a path or a treadmill, or any other user that listens, or views, multimedia content while on a route.

Hereinafter, exemplary embodiments of the present invention will be described in detail with reference to the attached drawings.

The present invention is not limited to the exemplary embodiments below, but may be implemented with various modifications within the scope of the present invention. In addition, the drawings used herein are for purposes of illustration, and may not show actual dimensions.

Figure 1:
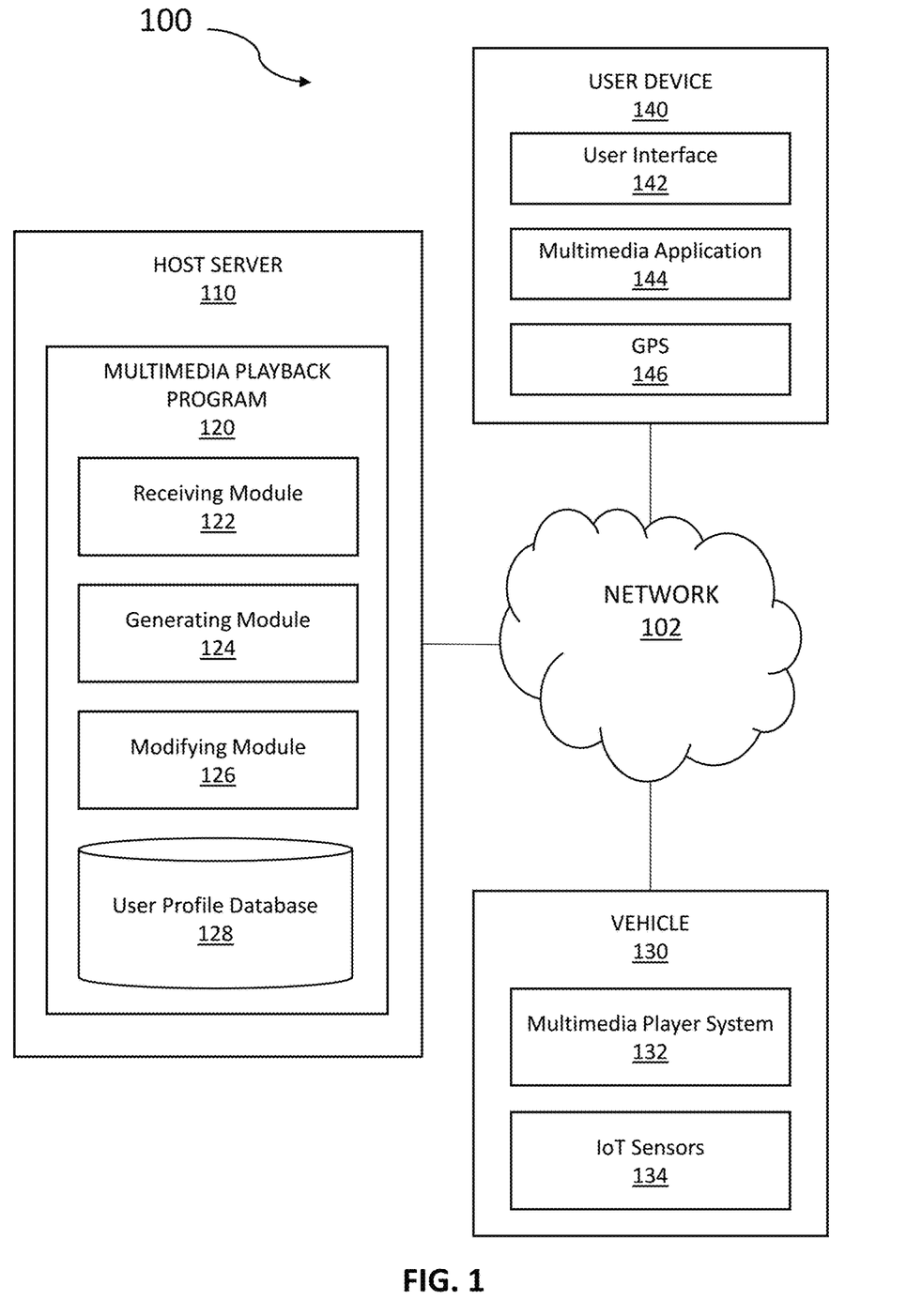
FIG. 1 illustrates a multimedia playback computing environment, in accordance with an embodiment of the present invention.

FIG. 1 illustrates multimedia playback computing environment 100, in accordance with an embodiment of the present invention. Multimedia playback computing environment 100 includes host server 110, vehicle 130, and user device 140, all connected via network 102. The setup in FIG. 1 represents an example embodiment configuration for the present invention, and is not limited to the depicted setup in order to derive benefit from the present invention.

In the example embodiment, host server 110 contains multimedia playback program 120. In various embodiments, host server 110 may be a laptop computer, tablet computer, netbook computer, personal computer (PC), a desktop computer, a personal digital assistant (PDA), a smart phone, a server, or any programmable electronic device capable of communicating with vehicle 130 and user device 140 via network 102. Host server 110 may include internal and external hardware components, as depicted and described in further detail below with reference to FIG. 4. In other embodiments, host server 110 may be implemented in a cloud computing environment, as described in relation to FIGS. 5 and 6, herein. Host server 110 may also have wireless connectivity capabilities allowing it to communicate with vehicle 130, user device 140, and other computers or servers over network 102.

With continued reference to FIG. 1, vehicle 130 contains multimedia player system 132. In exemplary embodiments, vehicle 130 may be a car, a minivan, a truck, or any other vehicle known to one of ordinary skill in the art (e.g., motorcycle, airplane, rocket ship, hovercraft, boat, jet-ski, yacht) capable of connecting to a multimedia player system 132.

In exemplary embodiments, multimedia player system 132 may be a digital media entertainment consumer electronics device that is capable of being connected to a vehicle 130 network to stream digital media such as music, photos, or digital video. In exemplary embodiments, multimedia player system 132 may stream files from a personal computer, a smart phone, a network-attached storage or another networked media server, to play the media over a sound system in vehicle 130. In alternative embodiments, the media may be played over a video projector or a television screen located within vehicle 130.

In exemplary embodiments, multimedia player system 132 may contain a radio, a CD player, a DVD player, and the ability to receive media input from a personal user computing device connected via a USB wire or wirelessly via an Internet of Things (IoT) network, Bluetooth® (Bluetooth and all Bluetooth-based trademarks and logos are trademarks or registered trademarks of Bluetooth SIG, Inc. and/or its affiliates) network, or any other wire or wireless connectivity known to one of ordinary skill in the art.

In exemplary embodiments, IoT sensors 134 are located in vehicle 130 and may include embedded computing systems that allow objects, such as user device 140, to be sensed or controlled remotely across existing network infrastructure, such as network 102, thus creating opportunities for more direct integration of the physical world into computer-based systems, and resulting in improved efficiency, accuracy, and economic benefit in addition to reduced human intervention.

In alternative embodiments, IoT sensors 134 may be embedded within various devices, such as user device 140, that contain a computer processing unit (CPU), memory, and power resource, and may be capable of communicating with vehicle 130, user device 140, and host server 110 over network 102.

In exemplary embodiments, vehicle 130 may be capable of communicating with user device 140 via an IoT network comprised of IoT sensors 134. An IoT network may comprise a network of physical devices (e.g., smart phones, mobile devices, hearing aids, wearables, etc.) and other items embedded with electronics, sensors, actuators, and connectivity which enables these objects to connect and exchange data. For example, vehicle 130, via IoT sensors 134, may be capable of detecting audio settings, and other user preferences (e.g., skip introductions of audiobooks, skip acknowledgments of audiobooks), of a user and incorporate these user preferences into multimedia player system 132.

In further embodiments, IoT sensors 134 in vehicle 130 may be capable of detecting driving habits and preferences of a user under various circumstances, such as average speed in rain, wind, and snow. IoT sensors 134 may further be capable of detecting a user's driving habits and preferences (e.g., speed, highway driving, backroads) when a user is alone in the vehicle 130 versus when a user is driving with friends, family, or others. In further embodiments, IoT sensors 134 in vehicle 130 may be capable of detecting various states of mind of a user, such as tired, hungry, upset, late for a meeting or event, early for a meeting or event, and so forth. IoT sensors 134 may be capable of communicating with one or more user devices 140 (i.e., e-calendar, clock, heart rate, weather, and so forth) to capture one or more of the above-mentioned scenarios.

In exemplary embodiments, the information gathered via IoT sensors 134 with reference to a particular user may be saved in a database, such as user profile database 128, in order to gather a broader picture of a user's driving habits under various circumstances over time, and may be used as a predictor for future driving habits of the user.

With continued reference to FIG. 1, user device 140 contains user interface 142, multimedia application 144, and global positioning system (GPS) 146. In various embodiments, user device 140 may be a laptop computer, tablet computer, netbook computer, personal computer (PC), a desktop computer, a personal digital assistant (PDA), a smart phone, a smart watch, or any programmable electronic device capable of communicating with host server 110 and vehicle 130 via network 102. User device 140 may include internal and external hardware components, as depicted and described in further detail below with reference to FIG. 4. In other embodiments, user device 140 may be implemented in a cloud computing environment, as described in relation to FIGS. 5 and 6, herein. User device 140 may also have wireless connectivity capabilities allowing it to communicate with host server 110, vehicle 130, and other computers or servers over network 102.

In an exemplary embodiment, user device 140 includes user interface 142, which may be a computer program that allows a user to interact with user device 140 and other connected devices via network 102. For example, user interface 142 may be a graphical user interface (GUI). In addition to comprising a computer program, user interface 142 may be connectively coupled to hardware components, such as those depicted in FIG. 4, for receiving user input. In the exemplary embodiment, user interface 142 is a web browser, however in other embodiments user interface 142 may be a different program capable of receiving user interaction and communicating with other devices.

In an exemplary embodiment, multimedia application 144 may be a software program, on user device 140, that contains multimedia content such as music, audiobooks, movies, lectures, photographs, videogames, and so forth. Multimedia application 144 may also be capable of playing stored, or live stream, multimedia content via user device 140, on its own, or via multimedia player system 132 in vehicle 130.

Multimedia application 144, in exemplary embodiments, is capable of communicating with host server 110, vehicle 130, and user device 140.

In exemplary embodiments, GPS 146 is a computer program on user device 140 that provides time and location information for a user. Modern GPS systems operate on the concept of time and location. In modern GPS systems, four or more satellites broadcast a continuous signal detailing satellite identification information, time of transmission (TOT), and the precise location of the satellite at the time of transmission. When a GPS receiver picks up the signal, it determines the difference in time between the time of transmission (TOT) and the time of arrival (TOA). Based on the amount of time it took to receive the signals and the precise locations of the satellites when the signals were sent, GPS receivers are capable of determining the location where the signals were received. In the exemplary embodiment, GPS 146 is capable of providing real-time location detection of the user, together with an estimated time of arrival for a given destination based on real-time traffic, weather conditions, and so forth. GPS 146 may also include alternate routes and/or means of transportation to reach a destination.

In exemplary embodiments, GPS 146 may include real-time information regarding traffic, emergency happenings on a route (i.e., car accident, bridge collapse, fire, etc.) or public events (i.e., sporting events, concerts) that may affect estimated travel time information. In various embodiments, GPS 146 may provide alternate routes to reach a destination.

In the exemplary embodiment, GPS 146 is located on user device 140. However, in alternative embodiments GPS 146 may be located on vehicle 130.

In exemplary embodiments, user device 140 may contain personal identifiers (i.e., a username), a personal identification number (PIN), or an access code that is capable of being paired, or matched, with multimedia player system 132 within vehicle 130 via Bluetooth® (Bluetooth and all Bluetooth-based trademarks and logos are trademarks or registered trademarks of Bluetooth SIG, Inc. and/or its affiliates), or over an IoT network. For example, if a user is playing multimedia content through a CD on multimedia player system 132, a user's preferences may still be detected by identifying the user through user device 140.

With continued reference to FIG. 1, multimedia playback program 120, in the exemplary embodiment, may be a computer application on host server 110 that contains instruction sets, executable by a processor. The instruction sets may be described using a set of functional modules. In exemplary embodiments, multimedia playback program 120 may receive input from vehicle 130 and user device 140 over network 102. In alternative embodiments, multimedia playback program 120 may be a computer application contained within vehicle 130, or as a standalone program on a separate electronic device.

With continued reference to FIG. 1, the functional modules of multimedia playback program 120 include receiving module 122, generating module 124, modifying module 126, and user profile database 128.

Figure 2:
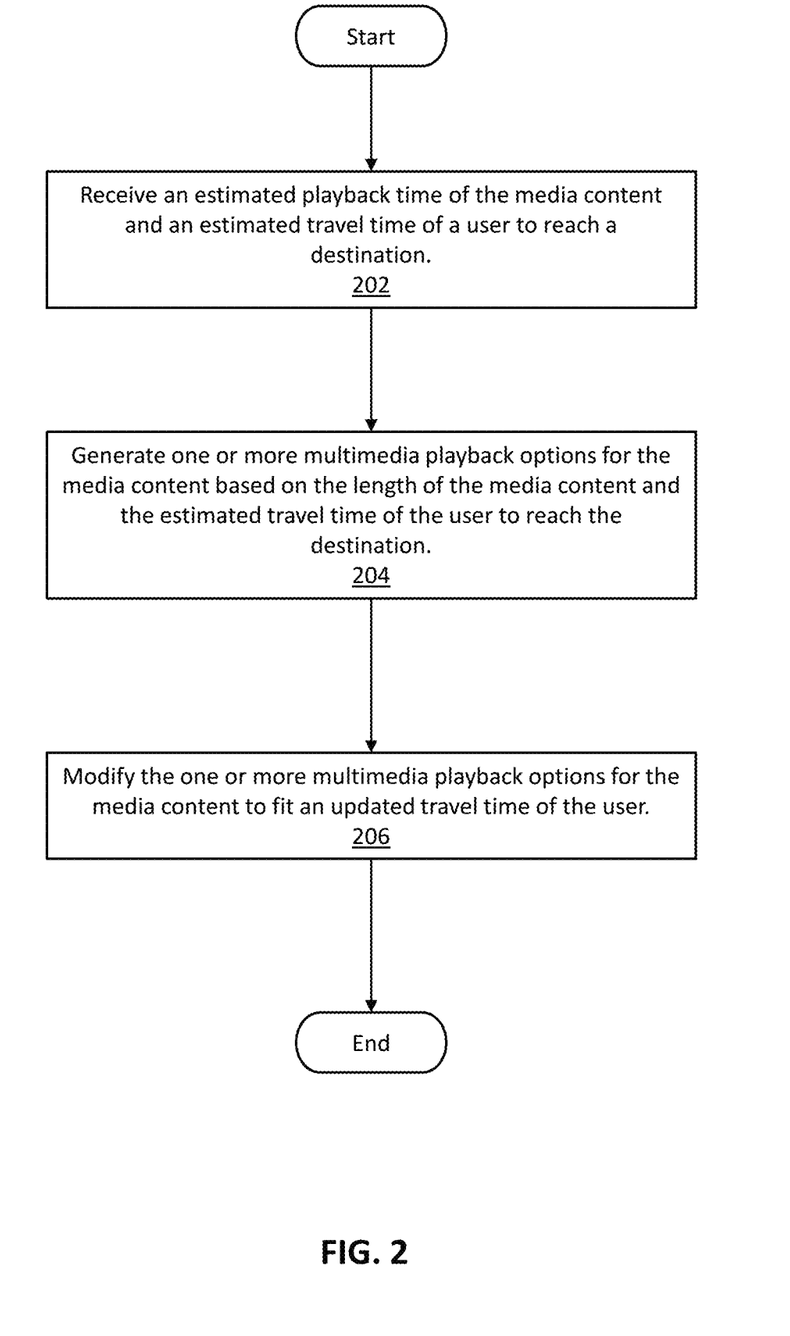
FIG. 2 is a flowchart illustrating the operation of multimedia playback program 120 of FIG. 1, in accordance with an embodiment of the present invention.

FIG. 2 is a flowchart illustrating the operation of multimedia playback program 120 of FIG. 1, in accordance with embodiments of the present invention.

Multimedia playback program 120 utilizes route information of a user to determine one or more multimedia playback options for media content, so as to provide the user with media content that does not stop in the middle of a chapter, or scene, but rather completes a chapter, or scene, within the estimated travel time of a user's route.

With reference to FIGS. 1 and 2, receiving module 122 includes a set of programming instructions in multimedia playback program 120, to receive an estimated playback time of the media content and an estimated travel time of a user to reach a destination (step 202). In exemplary embodiments, receiving module 122 receives input from multimedia application 144, GPS 146, multimedia player system 132, IoT sensors 134, and user profile database 128. In exemplary embodiments, the media content may contain one or more chapters that include breakpoints between each chapter. In further exemplary embodiments, the media content may just have a beginning and an end (i.e., a web conference, a lecture, etc.).

In exemplary embodiments, the estimated playback time of the media content may include the total time of the media content (i.e., an entire audiobook or music CD), and the time of various chapters, or scenes, of the media content. For example, multimedia application 144 may be a program that plays an audiobook selected by a user. The audiobook may run for 320 minutes, however each chapter, or break point, within the audiobook runs for various times (i.e., one chapter may play for 5 minutes, another chapter may play for 20 minutes, and so forth).

In exemplary embodiments, the estimated travel time of a user to reach a destination includes any one, or combination, of: a route to a destination (i.e., a route from point A to point B), road complexity (i.e., many blind turns, speed bumps, hidden driveways, etc.), traffic, weather conditions, road conditions, accidents on the road, speed limit, type of vehicle, speed of vehicle, state of a user, likelihood of deviation given historical destinations, and user driving habits. All of these factors may be initially taken into consideration by multimedia playback program 120 when providing an estimated travel time of a user to reach a destination. Similarly, the estimated travel time of a user may be dynamically updated based on real-time events along the route, as will be discussed further herein with reference to modifying module 126.

Figure 3:
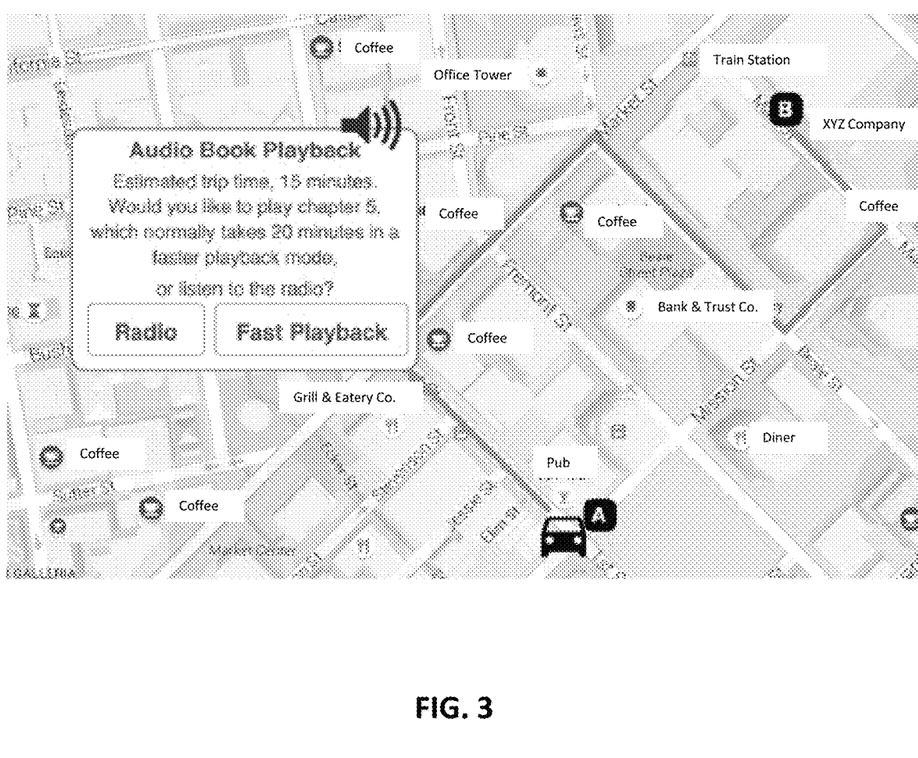
FIG. 3 illustrates a use case of multimedia playback program 120 of FIG. 1, in accordance with an embodiment of the present invention.

FIG. 3 illustrates a use case of multimedia playback program 120 of FIG. 1, in accordance with an embodiment of the present invention.

With reference to an illustrative example, as depicted in FIG. 3, Jane loves driving to work. Jane loves driving to work because she gets to enjoy her favorite audiobook while on the road without being disturbed by her kids fighting in the backseat. Receiving module 122 receives Jane's instruction that she is driving to work (Point B) from her apartment (Point A), the addresses of which are already saved in her user profile on user profile database 128. GPS 146 maps out Jane's drive and estimates a total travel time of 15 minutes (Point A to Point B). Jane opens up her favorite audiobook on multimedia application 144 on her smart phone, which is automatically paired to Jane's vehicle's 130 multimedia player system 132. Receiving module 122 receives the spot where Jane left off in her audiobook and detects that the next chapter (chapter 5) in the audiobook would take 20 minutes to get through at normal playback speed. As such, if there are no unexpected delays in reaching her destination, Jane will have an additional five minutes left of chapter 5 once reaching her destination. Since Jane does not like stopping mid-chapter, multimedia playback program 120 may provide Jane with some alternatives.

In exemplary embodiments, multimedia playback program 120 may be capable of building one or more user profiles within user profile database 128 associated with the one or more detected user devices 140 and the choices that specific users make with every multimedia session. For example, if a user typically skips the introduction chapters in an audiobook, then multimedia playback program 120 may tailor this feature to a specific identified user and skip the introduction chapters in an audiobook when a new audiobook is begun.

With continued reference to FIGS. 1 and 2, generating module 124 includes a set of programming instructions in multimedia playback program 120, to generate one or more multimedia playback options for the media content based on the length of the media content and the estimated travel time of the user to reach the destination (step 204). The set of programming instructions is executable by a processor.

In exemplary embodiments, the one or more multimedia playback options for the media content includes any one, or combination, of: a pause, a stop, slow down playback, speed up playback, and a switch to another media input source.

In exemplary embodiments, the switch from playing media content to another content form (e.g., car radio) may be done in a seamless manner, and multimedia playback program 120 may provide an explanation why the one or more multimedia playback options for the media content is chosen. For example, multimedia playback program 120 may explain to the user, via an audio output message or a pop-up notification on user device 140 or multimedia player system 132, why it is switching (e.g., the next chapter is 20 minutes long and the destination is expected to be reached in 5 minutes).

In exemplary embodiments, generating module 124 may be capable of querying the user to select the one or more multimedia playback options for the media content.

In exemplary embodiments, a user may respond to the query to select one or more multimedia playback options via a user's touch on a pop-up screen. In other embodiments, multimedia playback program 120 may be capable of recognizing a user's voice in response to multimedia playback program's 120 audio query, in order to keep the user hands free while driving.

With reference to voice recognition, a microphone may be used to detect a user's voice. For example, a user may speak into a vehicle speaker closest to them to identify themselves (e.g., "Watson, use my audio hands-free settings."). Voice recognition technology may require a saved individual profile in order to match a user's voice with saved profile settings.

With continued reference to the illustrative example in FIG. 3, chapter 5 of Jane's audiobook is 20 minutes long while Jane's estimated travel time to work is only 15 minutes. As such, generating module may display a pop-up screen on Jane's smart phone asking Jane to choose an option: either speed up playback of the 20-minute-long chapter in order to fit it into the 15-minute drive, switch to radio for the duration of the drive, or some alternative option.

In an alternative example, Jane is scheduled to arrive at her destination at 9:20 am. Chapter 5 of Jane's audiobook is scheduled to finish at 9:15 am. Chapter 6 of Jane's audiobook is 25 minutes long. Since multimedia playback program 120 stores information identifying that Jane does not like to stop listening to her audiobook mid-chapter, generating module 124 stops the audiobook after the completion of chapter 5. With 5 minutes left in her route, generating module 124 may automatically switch to Jane's car radio or CD player.

In further embodiments, the one or more multimedia playback options for the media content may comprise any one, or combination, of: an abridged version, an extended version, a synopsis, and a plot summary.

In exemplary embodiments, natural language processing methods, known to one of ordinary skill in the art, may enable multimedia playback program 120 to determine necessary portions of the media content (i.e., a chapter) to reveal to a user in the event the user chooses one of the playback options that skips one or more sentences (e.g., an abridged version, an extended version, a synopsis, and a plot summary). For example, portions of the media content (i.e., chapter) may include metadata that identifies necessary parts of the media content, as determined by subject matter experts.

With continued reference to the illustrative example in FIG. 3, Jane is listening to an audiobook for a school course and had planned to listen to one chapter a day on her drive to work in order to stay on course with the class. Jane missed two days of listening to her audiobook and wants to catch up, but does not want to listen to the chapters in their entirety since her driving time is limited. Multimedia playback program 120 generates one or more multimedia playback options of the missed one or more chapters, based on Jane's estimated driving time to reach her place of work. Multimedia playback program 120 may automatically play the shortened versions of the two missed chapters. Alternatively, Jane may be provided with an option to select a shortened version (e.g., abridged version, synopsis, plot summary). Jane selects the abridged version of the chapters she missed and is thus able to squeeze two complete chapters into her 15-minute drive to work.

With continued reference to FIGS. 1 and 2, modifying module 126 includes a set of programming instructions in multimedia playback program 120, to modify the one or more multimedia playback options for the media content to fit an updated travel time of the user (step 206). The set of programming instructions is executable by a processor.

In exemplary embodiments, an updated travel time of the user may include a recalibration of a user's route information based on real-time traffic, weather conditions, road conditions, car accidents, state of a driver, and any other detected change that may shorten or lengthen the initial estimated travel time of the user. In exemplary embodiments, modifications to the multimedia playback (e.g., extended version, speedup replay, and so forth) may be dynamically made on the fly, by modifying module 126, based on the updated travel time of the user and the associated playback options for the media content. In exemplary embodiments, the user has the capability to override the automatic multimedia playback option chose by multimedia playback program 120.

In various embodiments, modifying module 126 may modify the one or more multimedia playback options for the media content by determining an end of the media content and tailoring the media content to reach the end of the media content within the updated travel time of the user.

In alternative embodiments, multimedia playback program 120 may be capable of detecting an action state of the one or more users, such as whether a user is sleeping (e.g., user is a passenger in the car) or talking with another passenger in the car, and so forth. In such instances, modifying module 126 may be further capable of modifying the playback of the media content based on the detected action state of the one or more users, so that the user does not miss any of the multimedia playback.

In further embodiments, multimedia playback program 120 may be capable of providing an option to override one or more audio sources, from a plurality of audio sources connected to the multimedia player system 132.

In alternative embodiments, modifying module 126 may modify the one or more multimedia playback options for the media content based on any one, or combination, of: suggestions of author, suggestions of friends and family, previous playback preferences, and suggestions of crowdsourcing.

With continued reference to the illustrative example in FIG. 3, Jane hits a heavy patch of traffic on her way to work. GPS 146 updates Jane's estimated time of arrival from 15 minutes to 50 minutes. With the additional time in the car, modifying module 126 recalibrates and determines that Jane may comfortably listen to chapter 5 (20 minutes in length) and chapter 6 (25 minutes in length) on her drive to work. Since Jane's user preferences indicate that she prefers to listen to complete chapters, this is the best option chosen by modifying module 126.

In further exemplary embodiments, multimedia playback program 120 may be capable of modifying a route to fit the playback of the media content into the estimated travel time. For example, if a user is approaching her destination in 5 minutes and would like to finish a current chapter that has 10 minutes remaining, the user may use voice settings to update the driving route for an additional 5 minutes (e.g., "Watson, reroute my destination by 5 additional minutes of driving time."). In alternative embodiments, modifying module 126 may automatically adjust, or modify, the user's route in order to complete a chapter, based on user's preferences in user profile database 128.

In further exemplary embodiments, multimedia playback program 120 may be capable of modifying the driving speed of vehicle 130, along the route, to fit the playback of the media content into the estimated travel time. In various embodiments, the modification of the driving speed of vehicle 130 may be performed automatically by multimedia playback program 120 or conveyed to the user as a pop-up suggestion on user device 140, or via multimedia player system 132 on vehicle 130.

In further exemplary embodiments, multimedia playback program 120 may be capable of modifying a sequence of one or more destinations along the route to fit the playback of the media content into the estimated travel time.

In exemplary embodiments, multimedia playback program 120 may be capable of building one or more user profiles, in user profile database 128, associated with the one or more users. For example, individual user profiles may include an image of the user, a voice sample of the user, one or more user devices 140 associated with the user, or any other identifying characteristic of the user that may assist in associating a user with a saved profile within user profile database 128. Furthermore, user profiles may include a user's preferences for multimedia playback, such as "skip introductions and acknowledgments", provide plot summaries for each chapter in science fiction novels, provide a chapter synopsis for murder mystery novels prior to beginning each chapter, and so forth. In exemplary embodiments, user preferences are not static but rather change over time based on user selections.

In exemplary embodiments, user profile database 128 is local data storage on multimedia playback program 120 that may contain a list of one or more individual profiles associated with corresponding multimedia preferences and settings. The individual profile for a user may dynamically adjust based on a user's various choices in playback queries and settings over time and use.

While user profile database 128 is depicted as being stored on multimedia playback program 120, in other embodiments, user profile database 128 may be stored on host server 110, vehicle 130, user device 140, or any other device or database connected via network 102, as a separate database. In alternative embodiments, user profile database 128 may be comprised of a cluster or plurality of computing devices, working together or working separately.

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® (Bluetooth and all Bluetooth-based trademarks and logos are trademarks or registered trademarks of Bluetooth SIG, Inc. and/or its affiliates) network, an IoT network, a WiFi network, or a combination thereof. In general, network 102 can be any combination of connections and protocols that will support communications between host server 110, vehicle 130, and user device 140.

Figure 4:
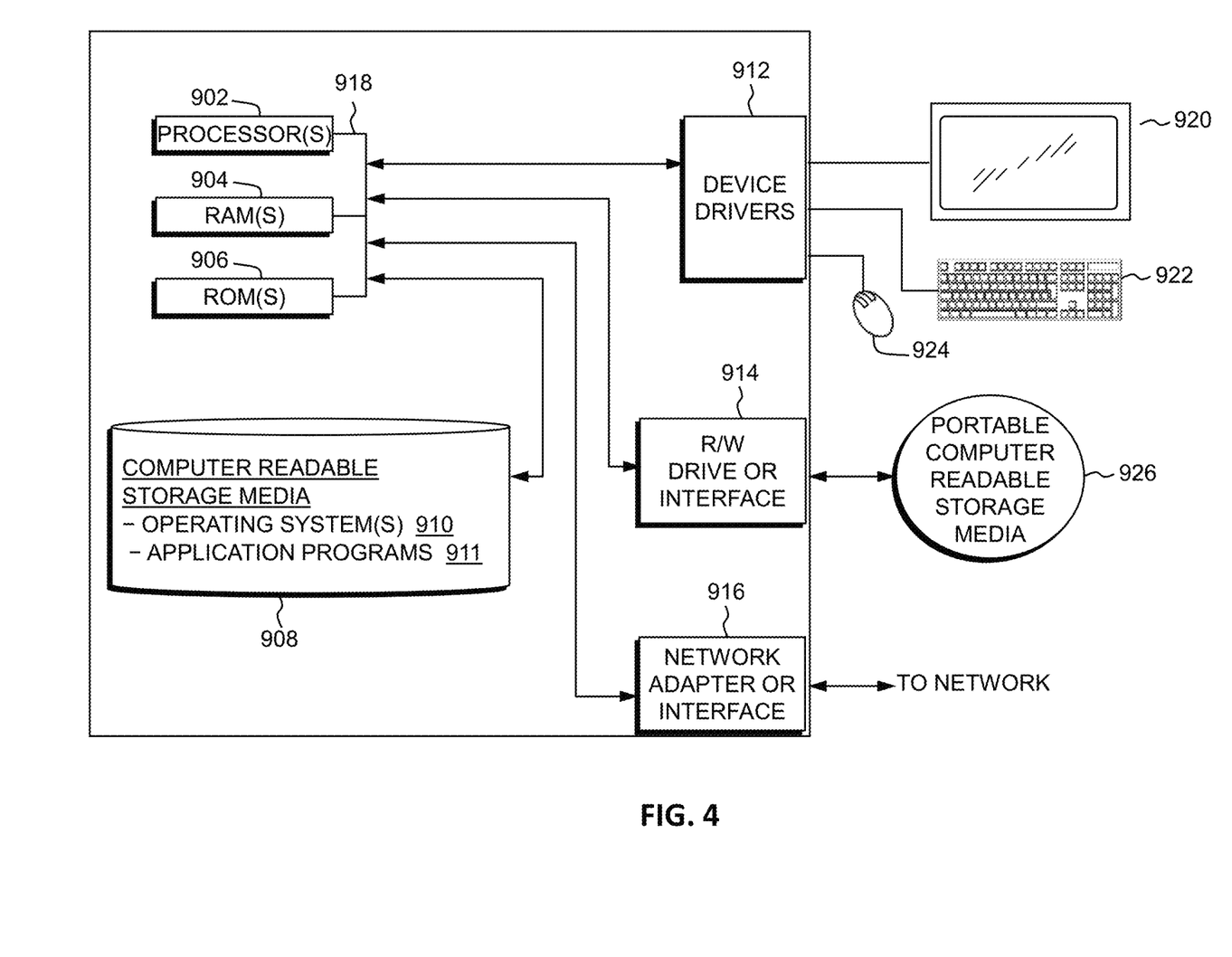
FIG. 4 is a diagram graphically illustrating the hardware components of multimedia playback computing environment of FIG. 1, in accordance with an embodiment of the present invention.

FIG. 4 is a block diagram depicting components of a computing device (such as host server 110, as shown in FIG. 1), in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Host server 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as multimedia playback program 120, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host server 110 may also include a R/W drive or interface 914 to read from and write to one or more portable computer readable storage media 926. Application programs 911 on host server 110 may be stored on one or more of the portable computer readable storage media 926, read via the respective R/W drive or interface 914 and loaded into the respective computer readable storage media 908.

Host server 110 may also include a network adapter or interface 916, such as a TCP/IP adapter card or wireless communication adapter (such as a 4G wireless communication adapter using OFDMA technology). Application programs 911 on host server 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host server 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
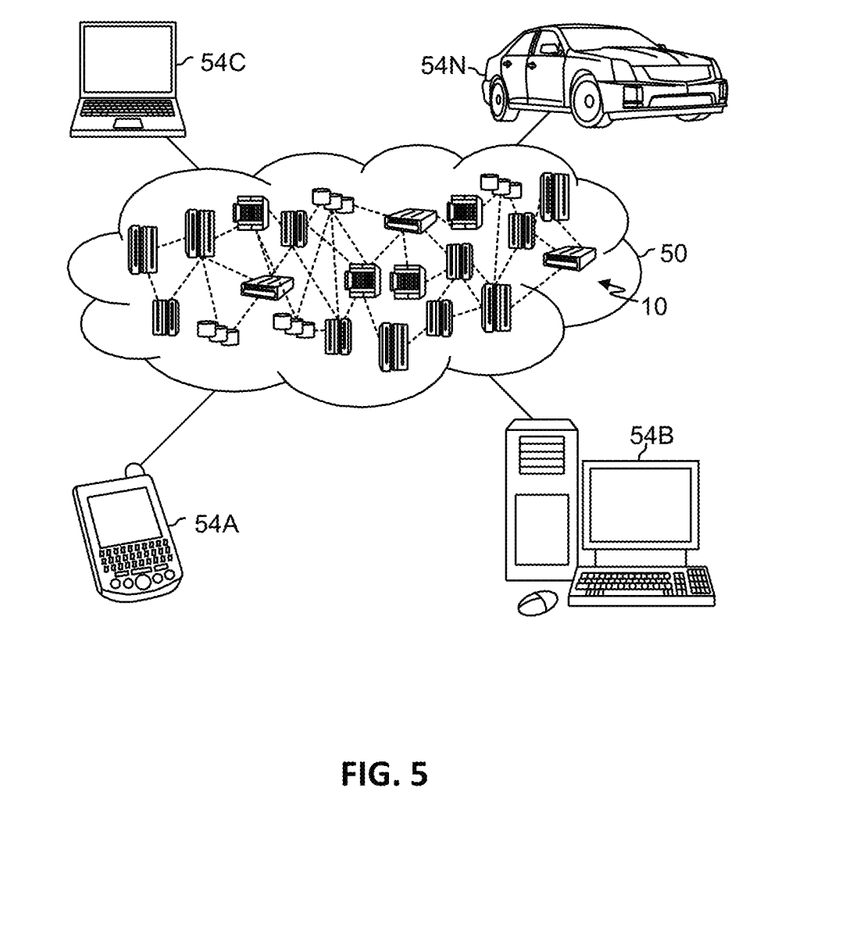
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
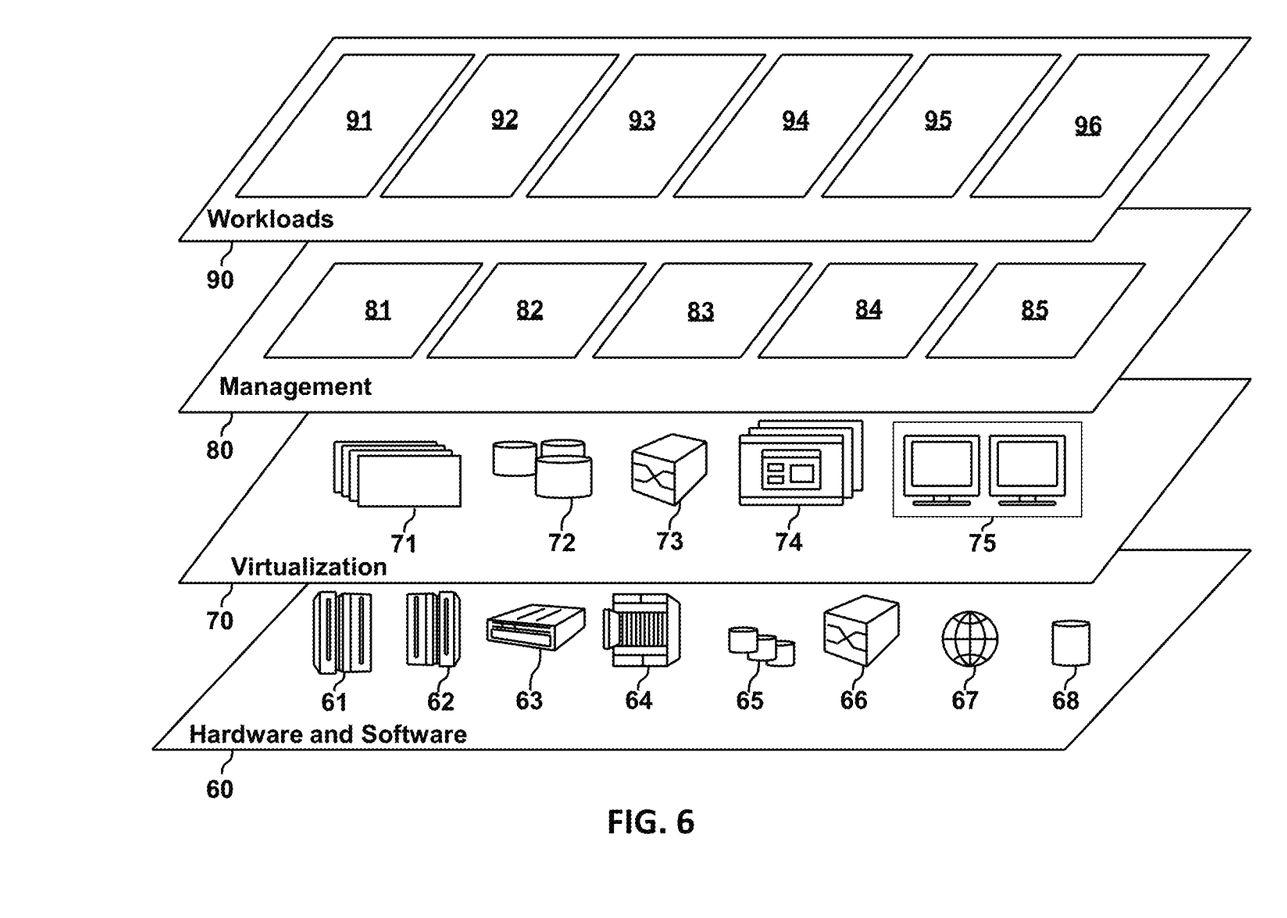
FIG. 6 depicts abstraction model layers of the illustrative cloud computing environment of FIG. 5, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling access to data objects 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The invention claimed is:

1. A computer-implemented method for modifying playback of media content to fit an estimated travel time of a user, comprising:
   receiving an estimated playback time of the media content and an estimated travel time of a user to reach a destination;
   generating one or more multimedia playback options for the media content based on a length of the media content and the estimated travel time of the user to reach the destination, wherein the one or more multimedia playback options for the media content comprises any one, or combination, of: a pause, a stop, slow down playback, speed up playback, and a switch to another media input source;
   querying the user to select the one or more multimedia playback options for the media content;
   obtaining an update to the estimated travel time of the user to reach the destination;
   adjusting the one or more multimedia playback options for the media content to conform with one or more preferences of the user, based on the update to the estimated travel time of the user to reach the destination;
   modifying a route to fit the playback of the media content into the estimated travel time;
   switching to another media input source, if the estimated playback time of the media content exceeds the estimated travel time of a user to reach a destination; and
   providing an explanation why the one or more multimedia playback options for the media content is chosen.

2. The computer-implemented method of claim 1, wherein the one or more multimedia playback options for the media content comprises any one, or combination, of: an abridged version, an extended version, a synopsis, and a plot summary.

3. The computer-implemented method of claim 1, further comprising:
   modifying the one or more multimedia playback options for the media content based on any one, or combination, of: suggestions of author, suggestions of friends and family, previous playback preferences, and suggestions of crowd-sourcing.

4. The computer-implemented method of claim 1, wherein modifying the one or more multimedia playback options for the media content comprises:
   determining an end of the media content; and
   tailoring the media content to reach the end of the media content within the update to the estimated travel time of the user.

5. The computer-implemented method of claim 1, wherein the estimated travel time of a user to reach a destination comprises any one, or combination, of: route to a destination, road complexity, traffic, weather conditions, road conditions, accident, speed limit, type of vehicle, speed of vehicle, state of a driver, likelihood of deviation given historical destinations, and user driving habits.

6. The computer-implemented method of claim 1, further comprising any one, or combination, of:
   modifying a route to fit the playback of the media content into the estimated travel time;
   modifying driving speed along the route to fit the playback of the media content into the estimated travel time; and
   modifying a sequence of one or more destinations along the route to fit the playback of the media content into the estimated travel time.

7. A computer program product, comprising a non-transitory tangible storage device having program code embodied therewith, the program code executable by a processor of a computer to perform a method, the method comprising:
   receiving an estimated playback time of the media content and an estimated travel time of a user to reach a destination;
   generating one or more multimedia playback options for the media content based on a length of the media content and the estimated travel time of the user to reach the destination, wherein the one or more multimedia playback options for the media content comprises any one, or combination, of: a pause, a stop, slow down playback, speed up playback, and a switch to another media input source;
   querying the user to select the one or more multimedia playback options for the media content;
   obtaining an update to the estimated travel time of the user to reach the destination; and
   adjusting the one or more multimedia playback options for the media content to conform with one or more preferences of the user, based on the update to the estimated travel time of the user to reach the destination;

modifying a route to fit the playback of the media content into the estimated travel time;

switching to another media input source, if the estimated playback time of the media content exceeds the estimated travel time of a user to reach a destination; and providing an explanation why the one or more multimedia playback options for the media content is chosen.

8. The computer program product of claim 7, wherein the one or more multimedia playback options for the media content comprises any one, or combination, of: an abridged version, an extended version, a synopsis, and a plot summary.

9. The computer program product of claim 7, further comprising:

modifying the one or more multimedia playback options for the media content based on any one, or combination, of: suggestions of author, suggestions of friends and family, previous playback preferences, and suggestions of crowd-sourcing.

10. The computer program product of claim 7, wherein modifying the one or more multimedia playback options for the media content comprises:

determining an end of the media content; and tailoring the media content to reach the end of the media content within the update to the estimated travel time of the user.

11. A computer system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

receiving an estimated playback time of the media content and an estimated travel time of a user to reach a destination;

generating one or more multimedia playback options for the media content based on a length of the media content and the estimated travel time of the user to reach the destination, wherein the one or more multimedia playback options for the media content comprises any one, or combination, of: a pause, a stop, slow down playback, speed up playback, and a switch to another media input source;

querying the user to select the one or more multimedia playback options for the media content;

obtaining an update to the estimated travel time of the user to reach the destination; and adjusting the one or more multimedia playback options for the media content to conform with one or more preferences of the user, based on the update to the estimated travel time of the user to reach the destination;

modifying a route to fit the playback of the media content into the estimated travel time;

switching to another media input source, if the estimated playback time of the media content exceeds the estimated travel time of a user to reach a destination; and providing an explanation why the one or more multimedia playback options for the media content is chosen.

12. The computer system of claim 11, wherein the one or more multimedia playback options for the media content comprises any one, or combination, of: an abridged version, an extended version, a synopsis, and a plot summary.

* * * * *